United States Patent [19]

Findley et al.

[11] 3,971,044

[45] July 20, 1976

[54] ELECTRONIC HORIZONTAL SHIFTING AND VARIABLE PRINT WIDTH IN A BUFFERED PRINTER

[75] Inventors: Gerald Ivan Findley, Morgan Hill; Teddy Lee Anderson, San Jose, both of Calif.

[73] Assignee: IBM Corporation, Armonk, N.Y.

[22] Filed: Nov. 11, 1974

[21] Appl. No.: 522,997

[52] U.S. Cl. .................................................. 354/9
[51] Int. Cl.[2] ........................................ G03B 15/24
[58] Field of Search ........................... 354/5, 8, 9, 7

[56] References Cited

UNITED STATES PATENTS

| | | | |
|---|---|---|---|
| 3,820,123 | 6/1974 | Ammann | 354/9 X |
| 3,864,697 | 2/1975 | Dillon et al. | 354/5 |

*Primary Examiner*—John Gonzales
*Attorney, Agent, or Firm*—Fraser and Bogucki

[57] ABSTRACT

In a buffered printer in which lines of graphic code bytes representing characters to be printed are successively advanced to a line buffer where they are sequentially sampled and the results used to modulate a laser beam undergoing successive scans of a printable medium to effect printing of the characters, an arrangement is provided for determining the size of the lefthand margin of the printable medium and the location adjacent the right-hand edge of the printable medium where printing is to be terminated. The arrangement sums count values representing a fixed offset adjacent the left edge of the printable medium and the distance between the end of the fixed offset and the horizontal location of the desired margin as determined by plural panel mounted switches to provide a first count which is carried out beginning with the start of each scan of the laser beam. Upon termination of the first count, sampling of the graphic code bytes and modulation of the laser beam are initiated simultaneously with the beginning of a second count representing the width of the printable medium minus the count value from the panel mounted switches. Upon completion of the second count, sampling of the graphic code bytes and modulation of the laser beam are terminated until the next scan is begun.

14 Claims, 7 Drawing Figures

ELECTRONIC HORIZONTAL SHIFTING AND VARIABLE PRINT WIDTH IN A BUFFERED PRINTER

BACKGROUND OF THE INVENTION

1. Field of the Invention

The present invention relates to printers of the type which print characters in response to coded digital data, and more particularly to arrangements within such printers for varying the width of the print lines in accordance with the width of the paper or other printable medium used and for horizontally shifting the print lines relative to the paper to provide a margin of desired size.

2. History of the Prior Art

Printers of the type which print graphic characters in response to coded character data in binary form have found widespread use in many data processing operations and systems. Such printers respond to the incoming coded character data to physically print the graphic characters represented by the character data as defined by the code thereof. The printing operation can assume various different forms including the well-known impact printer in which each segment of the coded character data results in the selection of a piece of type or other raised indicia. The selected piece of type strikes a piece of paper or other printable medium to effect printing of the desired graphic character.

Prior art printers of the type described suffer from a number of disadvantages which often limit their usefulness. One limitation of such printers lies in the difficulty or impossibility of providing a left-hand margin of desired size on the paper. Often printing is begun at a fixed location relative to the left edge of the paper so that the left-hand margin is fixed in size. In some arrangements where the size of the left-hand margin may be variable, such variations in size may be limited and may be relatively inconvenient and cumbersome in terms of the means used to adjust the size of the margin. In many prior arrangements the width of the print lines is not adjustable, so that once printing of a line is begun it continues despite the fact that the right-hand edge of the paper is passed. While this creates problems in certain types of systems, it is particularly disadvantageous in those systems where toner is used to coat a charged area with the toner being thereafter transferred to the paper. In such systems the toner on those portions of the print lines extending beyond the right-hand edge of the paper cannot be transferred onto the paper and instead falls loosely into the printing system causing damage and periodic shutdowns.

Accordingly, it would be desirable to provide a buffered printer in which the size of the left-hand margin is easily adjusted over a wide range.

It would also be desirable to provide in a buffered printer a capability of varying the widths of the print lines so that printing of each line can be terminated prior to or upon reaching the right-hand edge of the paper.

BRIEF DESCRIPTION OF THE INVENTION

In buffered printers according to the invention, lines of character code bytes communicated over a main channel from a data processing unit and representing lines of characters to be printed are translated into corresponding graphic code bytes. The lines of graphic code bytes are assembled into a page format, following which each of the lines is successively advanced into buffer means for printing. Each line of graphic code bytes stored in the buffer means causes selection of character image bits from writable character generator modules with the character image bits being used to modulate a laser beam undergoing successive scans of a printable medium comprising a defined area on a print drum corresponding to a paper to be printed by toner coated on the drum.

An oscillator generating timing pulses used to time the sampling of the graphic code bytes and modulating of the laser beam in accordance therewith is also used to decrement a counter which stores a first and then a second count. Decrementing the counter by the first count which is begun at the beginning of each scan of the laser beam allows the laser beam to traverse a fixed offset distance adjacent the left-hand edge of the printable medium and an adjustable horizontal distance before printing of the characters represented by the line of graphic code bytes stored in the buffer is initiated. The fixed offset is represented by a fixed count value which is added to a variable horizontal count value provided by panel mounted rotary switches to provide the first count. At the end of the first count the system begins decrementing the counter by the second count as printing of the graphic code bytes is begun, the second count being determined by subtracting the selected horizontal count from a count representing the width of the printable medium. When the counter has been decremented by the second count, printing of the characters corresponding to the graphic code bytes is terminated for that particular scan of the laser beam.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
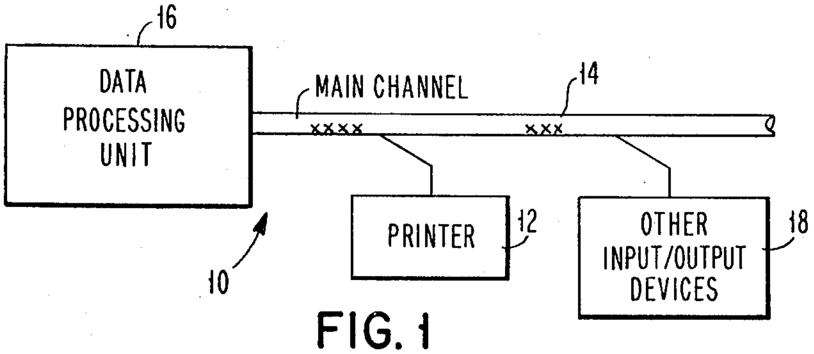
FIG. 1 is a basic block diagram showing the manner in which printers according to the invention are coupled to a data processing unit via a main channel.

FIG. 1 illustrates a data processing system 10 which includes a printer 12 in accordance with the invention coupled to a main channel 14 of a data processing unit or computer 16. The printer 12 comprises an input/output device, and the main channel 14 may be and is typically coupled to other input/output devices illustrated as 18 in FIG. 1.

The general operation of the data processing system 10 in conjunction with the printer 12 is described in detail in a co-pending application, Ser. No. 522,998, Gerald I. Findley, PRINTER. As described in that application the data processing unit 16 which typically includes a central processing unit and a main store communicates with the printer 12 and the other input/output devices 18 via the main channel 14. Character code bytes, each of which represents a different character to be printed by the printer 12, are originated in the data processing unit 16 and are communicated to the printer 12 as part of a channel command word sent to the main channel 14. Other channel command words originating in the data processing unit 16 include certain operating constants used in the printer 12 and certain instructions for the operation of the printer 12.

Figure 2:
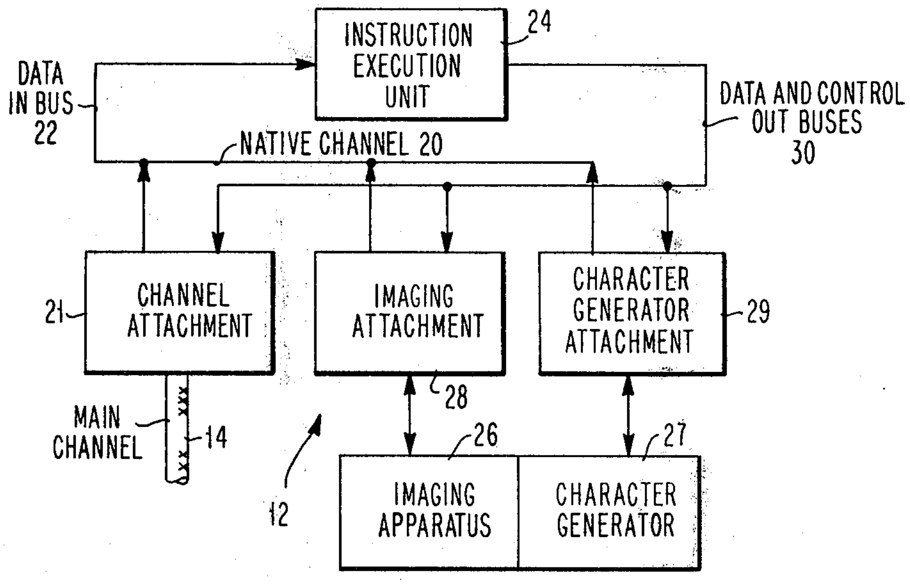
FIG. 2 is a block diagram of the basic components comprising the printer shown in FIG. 1.

FIG. 2 shows the basic arrangement of the printer 12 of FIG. 1 according to the invention. The printer 12 includes a native channel 20 coupled to the main channel 14 via a channel attachment 21 and providing appropriate interface between the main channel 14 and the printer 12. Data from the data processing unit 16 is communicated over the main channel 14 to the channel attachment 21 where it is carried by a data in bus 22 within the native channel 20 to an instruction execution unit (IEU) 24. The data in bus 22 also provides data to the instruction execution unit 24 from imaging apparatus 26 and a character generator 27. The imaging apparatus 26 is coupled to the native channel 20 via an imaging attachment 28, and the character generator 27 is coupled to the native channel 20 via a character generator attachment 29. Data at the output of the instruction execution unit 24 is carried by data and control out buses 30 to the character generator 27, the imaging apparatus 26 and the native channel 20.

The instruction execution unit 24 stores the data from the data processing unit 16 and executes the instructions provided by the various microroutines of microprograms loaded by the printer's user from a flexible disk storage. The microprograms define eight prioritized levels, during the last of which various commands from the main channel 14 are executed. Execution of the various microroutines initiates operation of the imaging apparatus 26, processes the data to be printed into an appropriate form for communication to the character generator 27, operates the character generator 27 to provide sets of character image bits corresponding to characters to be printed to the imaging apparatus 26, and operates the imaging apparatus 26 to effect printing of the desired characters.

The operation of the various components of the printer 12 shown in FIG. 2 is described in detail in the previously referred to co-pending application, Ser. No. 522,998.

Figure 3:
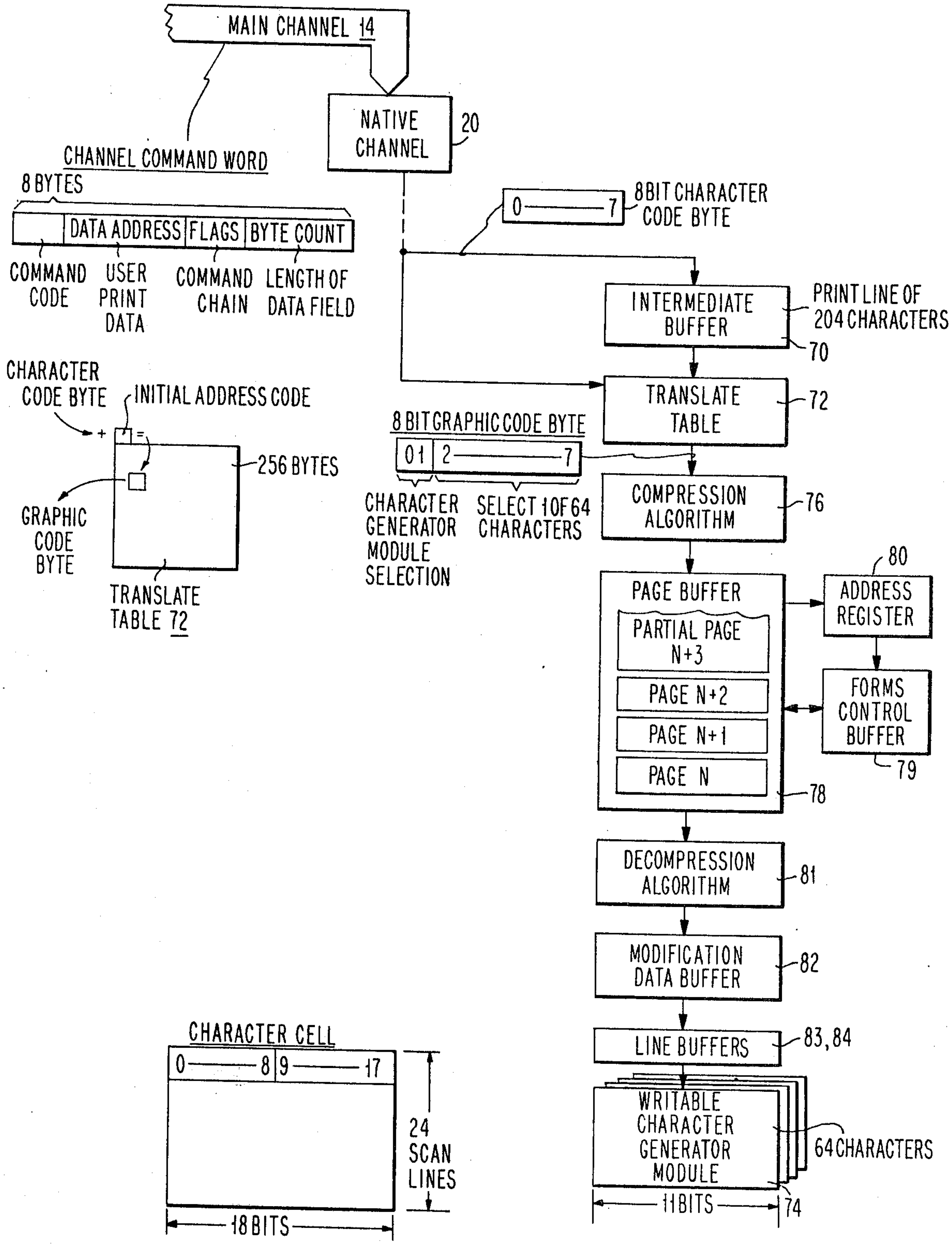
FIG. 3 is a block diagram illustrating a portion of the printer of FIG. 1 in detail.

Selected portions of the instruction execution unit 24 and the character generator 27 are illustrated in FIG. 3. The instruction execution unit 24 includes a writable control storage area providing for most of the various components shown in FIG. 3. The various components are set up within the writable control storage area using data and instructions communicated over the main channel 14 from the data processing unit 16.

Data representing characters to be printed are communicated by the data processing unit 16 and initially stored in the instruction execution unit 24 in the form of a succession of 8 bit character code bytes, with each byte representing a character to be printed. As illustrated in FIG. 3 the eight bit character code bytes which comprise the user print data portion of channel command words originated in the data processing unit 16 and communicated into the main channel 14 are directed via the native channel 20 to an intermediate buffer 70. The channel command word also includes a command code which the printer 12 is to execute, flags which control execution of the channel command word by the main channel 14 and a length of data field which indicates the number of characters in the print line which is comprised of the various 8 bit character code bytes in the user print data and which is communicated to the intermediate buffer 70.

Up to 204 of the character code bytes are assembled in the intermediate buffer 70 to form a print line. 204 characters represent the maximum width of a print line for paper of given width in the imaging apparatus 26. The 8 bit character codes employ a hexidecimal representation to compact the data and are encoded using the well-known EBCDIC code. the EBCDIC coding of the bytes defines the characters which the various bytes represent. The various character code bytes stored in the intermediate buffer 70 are applied to a translate table 72 where they are translated, one-by-one, into corresponding graphic code bytes using the predetermined code or algorithm of the translate table 72. The predetermined code or algorithm of the translate table 72 is implemented by adding each character code byte to an initial address for the table 72 and using the resulting sum as an address for the corresponding graphic code byte stored within one of the various storage locations in the translate table 72. The translate table 72 is capable of storing up to 256 graphic code bytes, and has a porition for all possible character codes that can come from the data processing unit 16. Each of the graphic code bytes comprises the address of a set of character image bits stored within one of four different writable character generator modules 74 in the character generator 27. As shown in FIG. 3 each 8 bit graphic code byte from the translate table 72 comprises a first two bit field identifying a particular one of the four different writable character generator modules 74 and a second six bit field identifying 1 of 64 different storage locations within the selected writable character generator module. The selection of a storage location within one of the writable character generator modules 74 by a graphic code byte results in a set character image bits stored in the particular location being used by the imaging apparatus 26 to print a character.

The graphic code bytes from the translate table 72 are next compressed in length using a compression algorithm 76 as they are entered into a page buffer 78 for storage therein. As previously mentioned each line may comprise as many as 204 characters. Since a page can have as many as 80 lines thereon for 11 inch paper, a page can comprise as many as 16,320 bytes. Since the purpose of the page buffer 78 is to assemble the translated data into one or more pages, the page buffer 78 would have to have a minimum capacity of 16,320 bytes per page in the absence of compression. By using the compression algorithm 76 however the graphic code bytes for an average page are sufficiently reduced in number so that an equivalent of only about 2000 bytes is required in the way of storage space for each page in the page buffer 78.

In the present example compression is performed whenever a succession of identical characters occurs which has more than a predetermined number of the characters in it. The resulting information stored in the page buffer 78 consists of a first byte which identifies the presence of a compression, a second byte which indicates the number of characters being compressed, and a third byte which is the character being compressed.

The page buffer 78 continues to assemble the compressed graphic code bytes into pages until filled. While the page buffer 78 is only required to store at least one complete page, it is typically provided with enough storage capacity to store several pages as shown in FIG. 3.

The channel command words from the data processing unit 16 include certain modifier bits which control the vertical format of each page in terms of the space between lines and the height of the characters in each line. These functions are provided by a forms control buffer 79 in conjunction with an associated address register 80. The operation of the forms control buffer 79 and the address register 80 is described in a copending application, Ser. No. 522,995, Gerald I. Findley and Teddy L. Anderson, INTERMIXED LINE HEIGHTS AND BLANK LINE FORMATION IN A BUFFERED PRINTER. As described in that application a different forms control byte is stored in the forms control buffer 79 for each line entered in the page buffer 78. The address register 80 identifies the various forms control bytes. One bit of each forms control byte defines the height of a corresponding line and is applied in the character generator 27 to select the number of scan lines used when the line is printed. Other bits in each forms control byte define a channel number. A channel command word defines blank lines to be inserted in a page by specifying the lines to be spaced or the channel number to be skipped to. Each time the address register 80 is incremented in spacing or skipping to the sought channel number within the forms control buffer 79 a special code is entered in the page buffer 78. When the page is being printed by the character generator 27, each of the special codes causes the character generator 27 to inhibit any modulator output so that a blank line results in the printed page.

The compressed graphic code bytes assembled into pages in the page buffer 78 are decompressed upon leaving the page buffer 78 by a decompression algorithm 80 which is the reverse of the compression algorithm 76 prior to being passed together with data from a modification data buffer 82 to one of a pair of line buffers 83, 84 within the character generator 27. The decompression algorithm 80 restores each graphic code byte to the original form that it assumes at the output of the translate table 72. The modification data buffer 82 stores data used in making minor changes between copies when plural copies of the same page are to be printed. This avoids the necessity of assembling a complete page in the page buffer 78 for each page which differs only in minor respects from a previously printed copy.

The imaging apparatus 26 of the present example modulates a laser beam as the beam is scanned in raster fashion over a character space to print each character. Each character space is defined by a character cell having a height defined by 24 scans of the laser beam and a width defined by 18 bits representing the number of times the beam can be modulated during each scan of the character cell. Each set of character image bits stored in one of the writable character generator modules 74 comprises as many as 432 bits defining the 18 horizontal bit spaces for each of the 24 different scans of the laser beam. Accordingly the character image bits define those portions of the grid pattern or matrix comprising the character cell which the particular character to be printed comprises.

Figure 4:
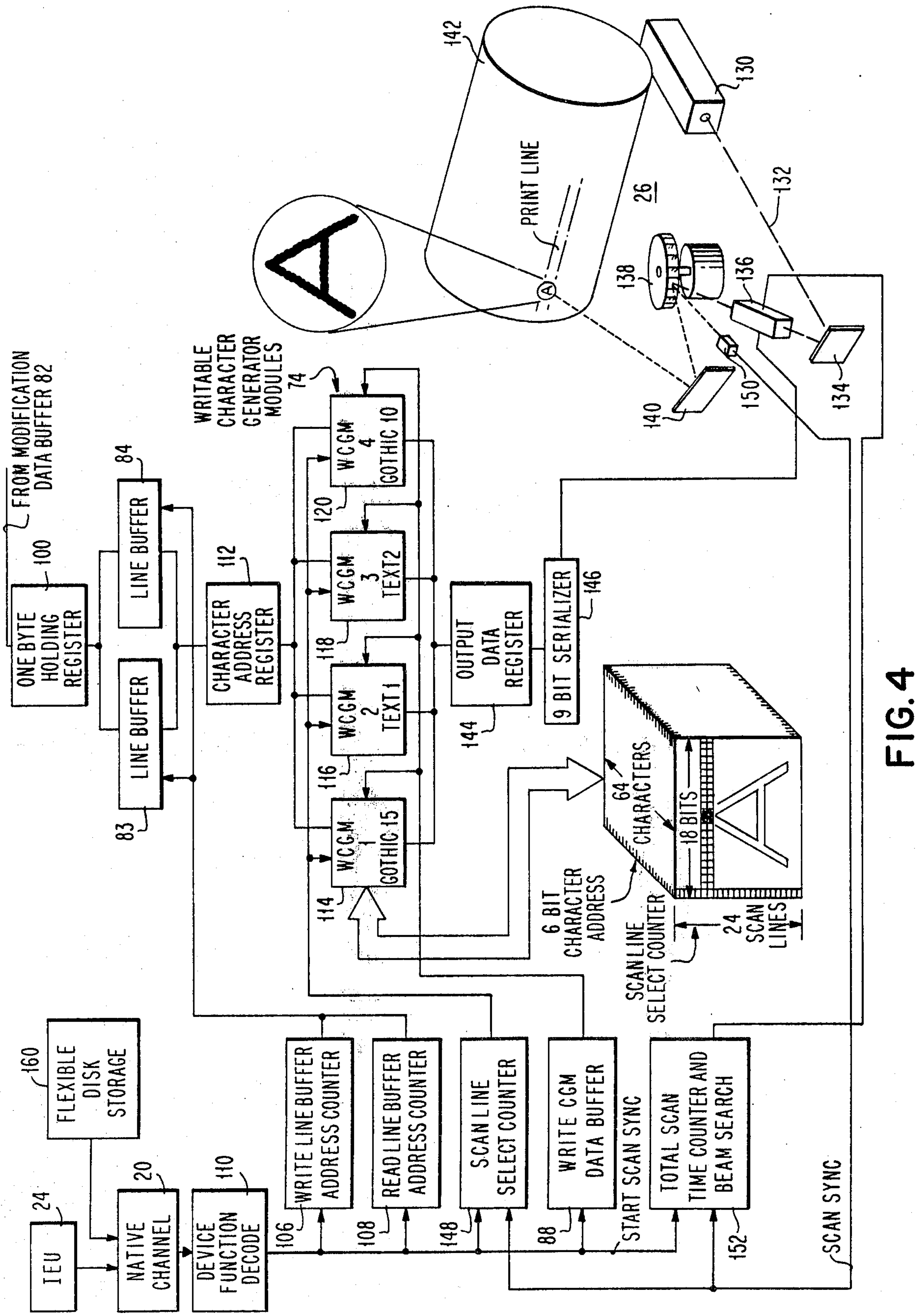
FIG. 4 is a block diagram illustrating another portion of the printer of FIG. 1 in detail.

The character generator 27 is shown in FIG. 4 together with a portion of the imaging apparatus 26. The graphic code bytes from the writable control storage 40 are fed via the native channel 20 to the character generator 27 where they are received by a 1 byte holding register 100 at the inputs of the line buffers 83 and 84. The loading and unloading of the line buffers 83 and 84 are controlled by a write line buffer address counter 106 and a read line buffer address counter 108 coupled to a device function decode 110. The device function decode 110 responds to control data from the instruction execution unit 24 which is intended for the character generator 27 to the exclusion of other data. The control data is fed via the native channel 20 to cause the contents of one of the line buffers 83, 84 to be passed to the writable character generator modules 74 for printing while the other line buffer is being loaded from the 1 byte holding register 100, and vice versa. Accordingly the line buffers 83 and 84 alternately load and print. While the write line buffer address counter 106 controls the loading of one of the line buffers 83, 84 one byte at a time to assemble a print line therein in response to control data from the microprogram, the read line buffer address counter 108 responds to the character generator attachment 29 to control the outputting of the other line buffer through a character address register 112 to the writable character generator modules 74.

In the present example the four different character generator modules 74 comprise modules 114, 116, 118 and 120. The first module 114 is loaded with Gothic 15 pitch characters, the second module 116 is loaded with characters conforming to a text 1, the third module 118 is loaded with characters conforming to a text 2 and the fourth module 120 is loaded with Gothic 10 pitch characters. Each of the modules 114, 116, 118 and 120 is capable of storing up to 64 characters. The contents of the first character generator module 114 are graphically illustrated in FIG. 4 in terms of the 24 scans of 18 bits each comprising each of the 64 characters. Two of the 18 bit scan lines are shown for the top portion of the character "A". As previously described the bits within the module 114 modulate a laser beam to produce the desired character.

The imaging apparatus 26 includes a laser 130 for providing a laser beam 132. The laser beam 132 is reflected by a mirror 134 through a modulator 136 and onto a rotating mirror 138. The rotating mirror 138 has a plurality of small mirrors spaced about the periphery thereof so as to reflect the laser beam from the modulator 136 into a mirror 140. The mirror 140 reflects the modulated laser beam onto a rotating print drum 142. The rotating mirror 138 rotates at a selected speed to provide a rapid succession of scans of the modulated laser beam across the print drum 142.

The modulator 136 causes the laser beam 132 to be modulated by bits from the character generator modules 74 applied via an output data register 144 and a 9 bit serializer 146. Timing of the character generator modules 74 is controlled by a scan line select counter 148 which is initialized to the first scan line at the start of each print line. The scan line select counter 148 operates in response to a scan sync signal from a scan start detector 150 to synchronize the outputting of bits from the character generator modules 74 with the rotation of the mirror 138. The scan start detector 150 generates a signal in response to each facet of the rotating mirror 138 and therefore signals the beginning of each scan. A total scan time counter and beam search 152 responds to a start scan sync signal from the device function decode 110 to initiate operation of the modulator 136. As each scan is begun the scan start detector 150 signals the scan line select counter 148 to pick a particular scan of a graphic in one of the writable character generator modules 74 and to begin feeding bits from one of the character generator modules 74 to the output data register 144. The read line buffer address counter 108 keeps a count of the various character positions in the line buffers 83, 84. At the beginning of each scan as determined by the scan line select counter 148, the character address register 112 causes selection of the appropriate bits from the writable character generator modules 74 under the control of the read line buffer address counter 108. The total scan time counter and beam search 152 responds to the scan sync signal at the start of each scan to turn on the modulator 136 and the laser 130 for the next scan start.

With sampling of a line of graphic code bytes in one of the line buffers 83, 84 having begun, the section representing the first half of the first scan of the first character temporarily stored in the output data register 144 is advanced to the 9 bit serializer 146 where each of the bits thereof is serially fed to the modulator 136 to modulate the laser beam 132 as it scans across the first half of the first character. At that point the second section of data is advanced through the output data register 144 to the 9 bit serializer 146, and the resulting serial stream of bits is used to modulate the laser beam during the second half of the first scan of the first character. At this point the laser beam is about to begin the first scan of the second character on the line. The first and then the second sections of bits representing the first scan of the second character are successively advanced through the output data register 144 and the 9 bit serializer 146 to modulate the laser beam. The system continues in this fashion until the laser beam has completed the first scan of each of the characters in the line, at which point the scan line select counter 148 is incremented and the next scan of the laser beam begins and is sensed by the scan start detector 150. The third and then the fourth sections of data bits for the first character are provided to the output data register 144 and the 9 bit serializer 146 to print the second scan of the first character. The third and fourth sections of bits for each succeeding character are used to modulate the laser beam until the second scan of the entire print line is completed. The system continues in this fashion until the laser beam has made 24 scans of the print line and all characters on the line have been printed. Thereafter the process is repeated for each succeeding print line.

As described in detail in the previously mentioned co-pending application, Ser. No. 522,998, the imaging apparatus 26 employs known electrophotographic techniques to develop the discharged areas on the surface of the drum 142 which result from the modulated laser beam 132. The drum 142 is rotated past a developer where the surface is coated with a toner which adheres to the discharged areas of the surface. The toner is transferred onto a paper which comes into contact with the drum surface, and the paper as so printed with the toner is advanced through a fuser to a continuous forms stacker.

Each scan of the laser beam 132 across the print drum 142 is begun at the same horizontal position on the print drum. When the laser beam 132 strikes this horizontal position so as to begin a scan, the scan start detector 150 responds by sending a scan sync signal to the scan line select counter 148 and the total scan time counter and beam search 152 as previously described. Simultaneously with the beginning of the scan, sampling of the line buffer 83, 84 being used to print the line is begun with appropriate character image bits from one of the character generator modules 74 being applied via the output data register 144 and the 9 bit serializer 146 to modulate the laser beam 132. Thus the printing of the lines temporarily stored in the line buffers 83, 84 is begun at the beginning of each scan of the laser beam 132, and thereby at the same horizontal position on the print drum 142.

There are many situations in which it may be desirable or necessary to be able to vary the horizontal position on the print drum 142 at which printing of the lines is begun. For example it may be difficult or inconvenient to change the lateral position of the paper relative to the print drum 142. For that matter it may be impossible in certain arrangements to change the lateral position of the paper with respect to the print drum 142. However even in situations where the paper position can be adjusted, it would still be highly advantageous to be able to vary the horizontal position along the print drum 142 at which printing of the lines begins.

As previously noted the print drum 142 as charged by the scanning laser beam 132 is coated with a toner before being rolled into contact with the paper to effect the printing. A serious problem arises where there is no paper to receive the toner on the pring drum 142. This situation may occur where the lines being printed extend beyond the right-hand edge of the paper. Thus for a given line length in which modulation of the laser beam terminates at a given horizontal position on the print drum 142, such horizontal position may extend to the right of the right-hand margin of the print paper by varying amounts. In such situations the toner coated onto that part of the print drum 142 to the right of the right-hand edge of the paper has a tendency to fall into the inside parts of the imaging apparatus 26 despite the presence of an arrangement for removing excess toner at one point in the rotational cycle of the print drum, creating a cleaning and contamination problem and eventually damaging the imaging apparatus 26. Accordingly, it would be desirable to be able to terminate modulation of the laser beam 132 during each scan before the scan passes a horizontal position on the print drum 142 corresponding to the right-hand edge of the print paper.

Figure 5:
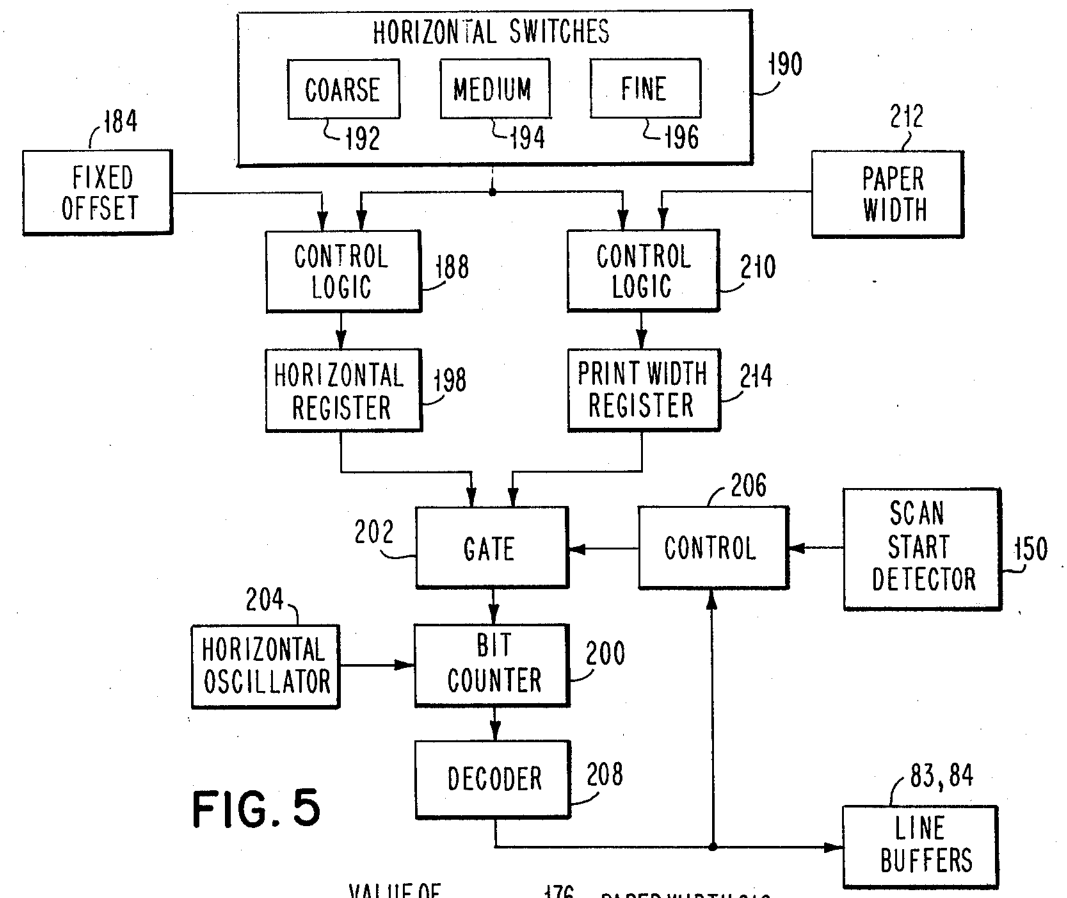
FIG. 5 is a block diagram of a portion of the printer of FIG. 1 used to provide horizontal shifting and variable print width.

FIG. 5 depicts one preferred arrangement in accordance with the invention for varying the margin at the left-hand edge of the print paper and for providing a selected horizontal position adjacent the right-hand edge of the paper for terminating the printing of each line. The operation of the arrangement of FIG. 5 may be best understood in conjunction with FIG. 6 which depicts a piece of print paper 170 and FIG. 7 which is a timing diagram for the arrangement of FIG. 5.

Figure 6:
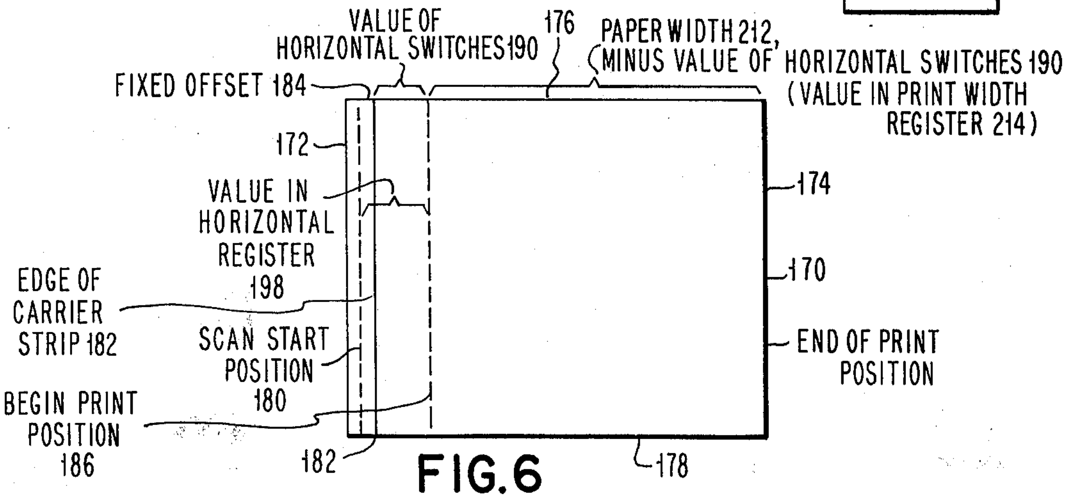
FIG. 6 is a plan view of a printable medium useful in explaining the operation of the arrangement of FIG. 5.
Figure 7:
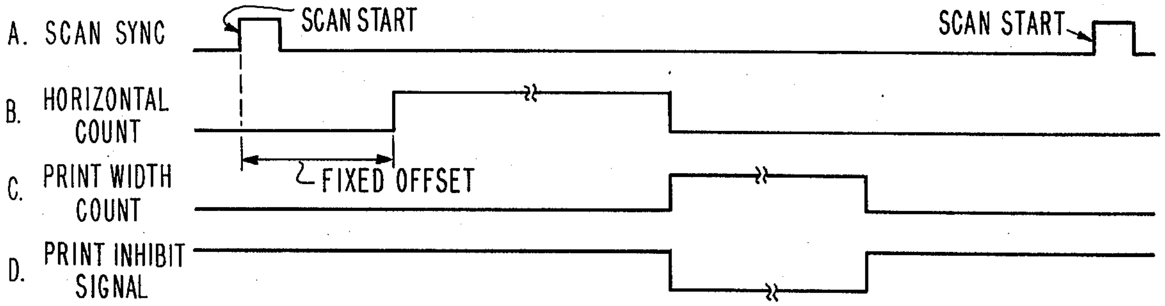
FIGS. 7A–7D are waveforms useful in explaining the operation of the arrangement of FIG. 5.

It should be kept in mind during the following discussion that while FIG. 6 is described in terms of the piece of print paper 170, it is only after the print drum 142 is charged by the scanning laser beam 132 and coated with toner that the paper is actually encountered. Since for purposes of present discussion the area of the print drum 142 being charged must be thought of in terms of the exact position and configuration of the paper 170, the paper 170 is described as though it were superimposed on the area of the print drum 142 being scanned.

As shown in FIG. 6 the piece of print paper 170 has a left edge 172, a right edge 174, a top edge 176 and a bottom edge 178. The width of the paper 170 is defined by the distance between the left and right edges 172 and 174. The scans of the laser beam are made in the width direction from left to right. Each scan begins at the same horizontal position adjacent the left edge 172 of the paper 170. This scan start position 180 is denoted by a vertical dashed line in FIG. 6. The first scan begins near the top edge 176 with subsequent scans occurring below each other such that the scans progress downwardly toward the bottom edge 178.

In the absence of the arrangement of FIG. 5 for providing horizontal shifting and for varying the print width, printing of each line begins at the scan start position 180 and terminates when all of the graphic code bytes in the line buffer 83, 84 being used have been sampled. The paper 170 has a carrier strip 182 of uniform width adjacent the left edge 172 thereof which should not be printed on. Since the scan start position 180 occurs within the carrier strip 182 the portion of each line occurring between the scan start position 180 and the right-hand edge of the carrier strip 182 cannot be printed. Furthermore there is no way to provide a margin except by adjusting the incoming data to the printer so that the first portion of each print line is filled with blank spaces. Once printing is begun, it is continued until the last character in the line buffer 83, 84 being used has been printed. If the paper 170 is too narrow for the print lines, laser modulation will continue as the scans pass beyond the horizontal position corresponding to the right edge 174 of the paper 170. This results in discharged areas on the print drum 142 to the right of as well as to the left of the horizontal position corresponding to the right edge 174 of the paper 170. When the print drum 142 is coated with toner and rolled into engagement with the paper 170, the toner adjacent the paper 170 is transferred to the paper to effect the desired printing. However the toner to the right of the right edge 174 remains on the print drum 142. This unused toner falls into and contaminates the imaging apparatus 26 despite the presence of a mechanism for removing unused toner from the print drum 142. As a result the imaging apparatus 26 is rendered inoperative by the toner contamination.

The arrangement of FIG. 5 provides for a fixed offset to clear the carrier strip 182 and a margin of variable size therafter before printing is begun. The arrangement of FIG. 5 also terminates the printing process before each scan passes to the right of the right edge 174 of the paper 170. As seen in FIG. 6 the fixed offset 184 is the distance between the scan start position 180 within the carrier strip 182 and the right-hand edge of the carrier strip. The fixed offset 184 insures that regardless of the size of the left-hand margin on the page, printing will not begin until the scans clear the carrier strip 182. In the present example a margin of desired size is provided so that printing does not begin until the position shown by the dotted line 186 is reached. Printing begins at the line 186 and is terminated at the right edge 174 if not before the right-hand edge is reached.

Referring to FIG. 5 the fixed offset 184 is provided to control logic 188 in the form of a digital value defining a fixed number of raster bits to be counted during each scan. A plurality of horizontal switches 190 on an operator panel for the printer provide to the control logic 188 a binary value defining the number of raster bits between the right-hand edge of the carrier strip 182 and the desired beginning print position 186. The horizontal switches 190 include coarse, medium and fine switches 192, 194 and 196 respectively in the form of rotary switches. The control logic 188 adds the fixed offset 184 to the value from the horizontal switches 190 to provide a binary value which is stored in a horizontal register 198 and which defines a first count value for a bit counter 200 when applied via a gate 202.

The bit counter 200 is coupled so as to be decremented in response to timing pulses provided by a horizontal oscillator 204. The horizontal oscillator 204 which is a part of the total time scan counter and beam search 152 shown in FIG. 4 provides a constant clock rate for the system in the form of a succession of raster bit periods, each of which defines a fixed increment of movement of the laser beam 132 as it scans across the print drum 142. When printing is occurring, each raster bit period defines the time during which one of the character image bits from the writable character generator modules 74 modulates the laser beam 132.

As previously described in connection with FIG. 4 the start of each scan of the laser beam 132 is detected by a scan start detector 150 which provides a scan sync signal to the total scan time counter and beam search 152 and the scan line select counter 148. The scan sync signal which is shown in FIG. 7A is also applied via a control circuit 206 to the gate of FIG. 5. The control circuit 206 responds to the leading edge of each pulse of the scan sync denoting the beginning of a scan to condition the gate 202 to pass the first count value stored in the horizontal register 198 to the bit counter 200. The bit counter 200 is thereafter decremented in response to timing pulses from the horizontal oscillator 204 as the scan advances to the right through the fixed offset and the margin value provided by the horizontal switches 190. The horizontal count provided by the switches 190 is shown in FIG. 7B. As the scan reaches the line 186, the bit counter 200 is decremented to zero, and a decoder 208 responds by activating the line buffers 83, 84 within the character generator 27 to begin sampling of the graphic code bytes and printing of the characters represented thereby. Thereafter the system functions in the manner described in connection with FIG. 4. As each graphic code byte in one of the line buffers 83, 84 is examined the corresponding character image bits from the writable character generator modules 74 are advanced through the output data register 144 to the 9 bit serializer 146 where they are applied to the modulator 136 to modulate the laser beam 132.

In addition to being provided to the control logic 188 the binary horizontal count value provided by the horizontal switches 190 is also passed to a control logic 210 together with a binary value 212 representing the width of the paper between the right-hand edge of the carrier strip 182 and the right edge 174. The control logic 210 subtracts the value of the horizontal switches 190 from the paper width 212 and stores the difference in the form of a second count value in a print width register 214. The difference between the paper width and the value of the horizontal switches corresponds to the distance between the line 186 and the right edge 174 of the paper 170 and defines the print width for the paper.

When the bit counter 200 has been decremented to zero from the first count value so as to initiate printing via the decoder 208 and the line buffers 83, 84, the control circuit 206 responds by conditioning the gate 202 to pass the second count value stored in the print width register 214 to the bit counter 200. As the scan advances to the right of the line 186 and printing is begun, the bit counter 200 is decremented in response to the timing pulses from the horizontal oscillator 204. This process continues until the bit counter is decremented to zero, at which point the scan is at the right edge 174 of the paper 170. As the bit counter 200 is decremented to zero, the decoder 208 responds by terminating the sampling of graphic code bytes in the line buffers 83, 84 so as to thereby terminate selection of character image bits and modulation of the laser beam.

In most instances the print lines are sufficiently short in relation to the width of the paper so that sampling of the graphic code bytes and printing of the characters represented thereby will be completed before the scans of the laser beams reach the right edge 174 of the paper 170. However in those cases where the print line is longer than the available print width of the paper, the second count value provided by the print width register 214 insures that the printing process will be terminated as the scan reaches the right edge 174 of the paper 170. The second or print width count provided by the print width register 214 is illustrated in FIG. 7C with the corresponding inhibit function at the output of the decoder 208 being illustrated in FIG. 7D. As will be seen by examination of the waveform of FIG. 7D the arrangement of FIG. 5 inhibits printing until a desired horizontal position on the paper is reached and thereafter allows printing only to the extent permitted by the width of the paper.

The process described above is repeated for each separate scan of the laser beam. At the beginning of each scan the first count value from the horizontal register 198 is entered in the bit counter 200 and decremented while the beam advances to the beginning print position line 186, at which point printing is commenced and the second count value stored in the print width register 214 is entered in the bit counter 200 and decremented. When the second count value has been decremented, the printing process is terminated automatically if it is still occurring at that point.

In the present example the timing of the printer is such that the horizontal oscillator 204 generates 180 timing pulses for each inch of travel of the laser scan across the width of the paper 170. Each of the rotary switches 192, 194 and 196 comprising the horizontal switches 190 is capable of providing four bit positions, providing for a total capability of twelve bit positions from the horizontal switches 190. Only ten of these bit positions are used so as to be capable of representing up to 1024 pulse counts of the horizontal oscillator 204. At a rate of 180 pulse counts or raster bits per inch this provides a margin capability of over 5 inches.

While the invention has been particularly shown and described with reference to a preferred embodiment thereof, it will be understood by those skilled in the art that various changes in form and details may be made therein without departing from the spirit and scope of the invention.

What is claimed is:

1. A printing system comprising the combination of:
means for providing data representing characters to be printed;
a printable medium;
means for undergoing successive scans across the width of the printable medium;
means associated with the means for undergoing scans and responsive to the data for printing characters represented by the data on the printable medium as the scans are made when the means for printing is turned on; and
means responsive to the start of each scan of the means for undergoing scans for turning on the means for printing after the means for undergoing scans has scanned a selected, adjustable distance across the width of the medium.

2. The invention defined in claim 1, wherein the selected distance is comprised of a fixed distance which compensates for the characteristics of the printable medium and a variable disitance which determines the width of a margin between an edge of the printable medium and the location along the width of the printable medium where printing of the characters is begun.

3. The invention defined in claim 1, further including means responsive to each turning on of the means for printing for turning the means for printing off after the means for undergoing scans has scanned a second selected distance across the width of the medium.

4. The invention defined in claim 3, wherein the second selected distance is comprised of the width of the printable medium minus a portion of the first-mentioned selected distance.

5. A printing system comprising the combination of:
means for storing successive lines of data representing lines of characters to be printed;
a printable medium having opposite edges separated by a distance defining the width of the medium;
means for providing an energy beam;
means for causing the energy beam to undergo successive scans across the width of the printable medium;
means responsive to the successive lines of data for modulating the energy beam during a succession of scans acros the width of the printable medium to sequentially print the characters represented by the data of the line on the printable medium, said means for modulating beginning modulation of the energy beam when rendered operative and terminating modulation of the energy beam when rendered inoperative; and
means for rendering operative the means for modulating during each scan when the energy beam is a selected, adjustable distance from one of the opposite margins of the printable medium.

6. The invention defined in claim 5, further including means for rendering inoperative the means for modulating during each scan when the energy beam is a second selected distance from said one of the opposite margins of the printable medium.

7. The invention defined in claim 5, wherein the means for rendering operative the means for modulating comprises means for storing a selected count value defining the selected distance, means responsive to the start of each scan for counting the selected count value, and means for rendering operative the means for modulating when the selected count value has been counted.

8. The invention defined in claim 7, wherein each scan begins a fixed distance from said one of the opposite margins of the printable medium and the selected count value includes a fixed value defining the distance between the beginning of each scan and a location on the printable medium where printing can begin and a variable value defining the distance between the location on the printable medium where printing can begin and a location on the printable medium where printing is to begin.

9. The invention defined in claim 8, further including means for storing a second selected count value defining a second selected distance, the second selected count value comprising a value corresponding to the width of the printable medium less the variable value defining the distance between the location on the printable medium where printing can begin and location on the printable medium where printing is to begin, means responsive to each rendering operative of the means for modulating for counting the second selected count value, and means for rendering inoperative the means for modulating when the second selected count value has been counted.

10. A printing system comprising the combination of:

means for successively storing a different one of a plurality of lines of data, each line of data representing a line of characters to be printed on a page;

a printable medium of generally rectangular outline having opposite left and right edges separated by a uniform distance defining the width of the medium;

means for providing an energy beam;

means for causing the energy beam to undergo scans across the width of the printable medium, the scans advancing successively from the top to the bottom of the medium and beginning a fixed distance from the left edge of the printable medium;

means for repetitively generating timing pulses during each scan of the energy beam;

means for sequentially sampling the data in each line of data starting with the beginning of the line of data in synchronism with the timing pulses when activated, the means for sequentially sampling the data terminating the sampling of data when deactivated;

means responsive to the sequential sampling of the data for modulating the energy beam in accordance with the data as it is sampled;

means for storing a first count representing the desired size of a margin adjacent the left edge of the printable medium;

means for storing a second count representing the location relative to the right edge of the printable medium where printing of the lines is to be terminated;

counter means;

means responsive to the beginning of each scan for coupling the counter means to count the first count in synchronism with the timing pulses;

means responsive to completion of the first count by the counter means for activating the means for sequentially sampling;

means responsive to completion of the first count by the counter means for coupling the counter means to count the second count in synchronism with the timing pulses; and means responsive to completion of the second count by the counter means for deactivating the means for sequentially sampling.

11. The invention defined in claim 10, wherein the printable medium has an unprintable strip of uniform width along the left edge thereof, and further including means for providing a fixed offset count representing the distance between the location on the printable medium where each scan begins and the edge of the unprintable strip opposite the left edge of the printable medium, means for providing a horizontal count representing the distance between the edge of the unprintable strip opposite the left edge of the printable medium and the location on the printable medium where printing of each line of characters is to begin, and means for adding the fixed offset count and the horizontal count to form the first count.

12. The invention defined in claim 11, further including means for providing a page width count representing the distance between the edge of the unprintable strip opposite the left edge of the printable medium and the right edge of the printable medium, and means for subtracting the horizontal count from the page width count to form the second count.

13. The invention defined in claim 10, further including operator adjustable means coupled to the means for storing a first count for determining the size of the first count.

14. The invention defined in claim 13, wherein the operator adjustable means comprises a plurality of switches for providing a desired binary value.

* * * * *